July 30, 1968  GENICHIRO TOMIOKA  3,394,589
APPARATUS FOR MEASURING LIQUID LEVEL
Filed March 4, 1966  4 Sheets-Sheet 3

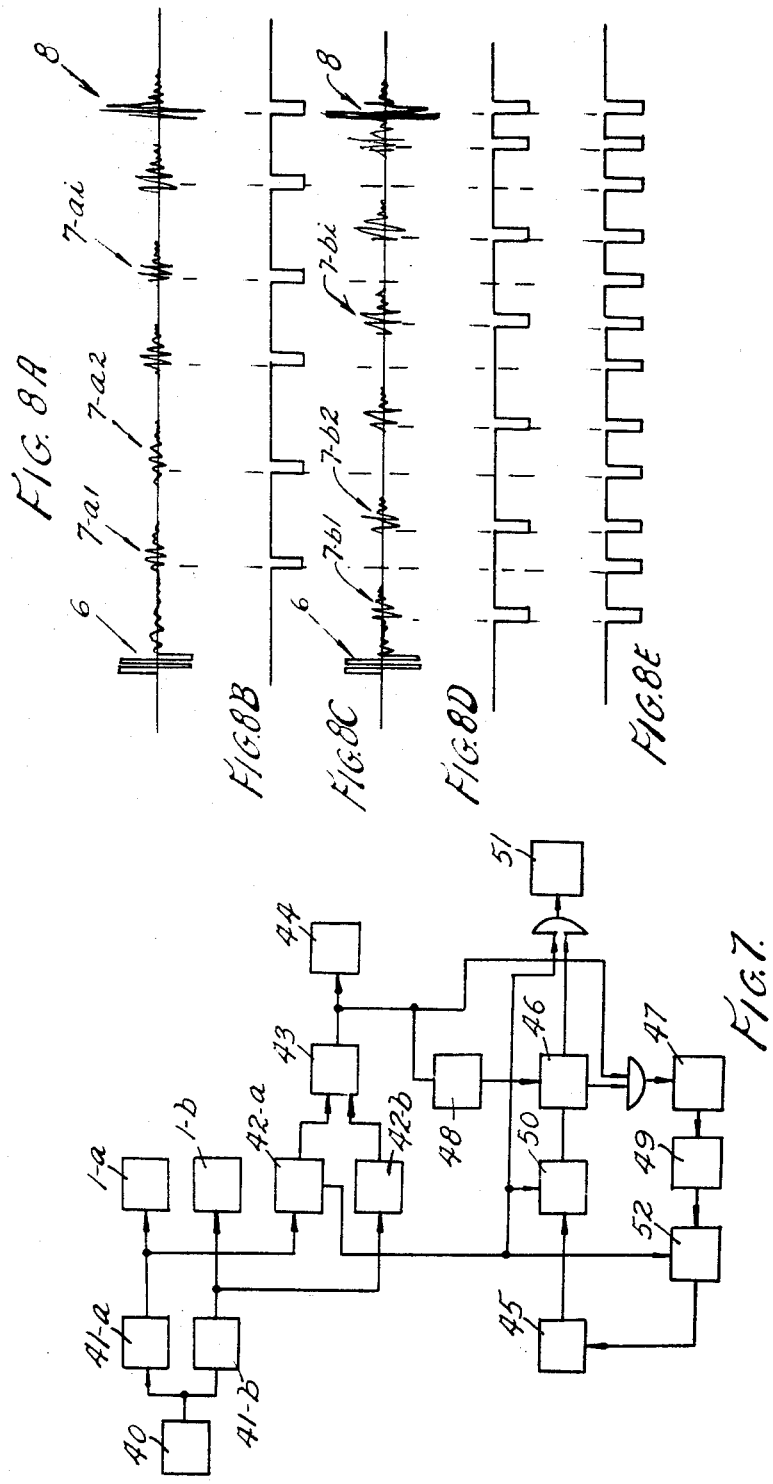

United States Patent Office 3,394,589
Patented July 30, 1968

3,394,589
APPARATUS FOR MEASURING LIQUID LEVEL
Genichiro Tomioka, Tokyo, Japan, assignor to Japan Radio Company, Limited, Tokyo, Japan, a corporation of Japan
Filed Mar. 4, 1966, Ser. No. 531,989
Claims priority, application Japan, Mar. 8, 1965, 40/13,373; Dec. 7, 1965, 40/75,136
5 Claims. (Cl. 73—290)

ABSTRACT OF THE DISCLOSURE

The oscillations of an acoustical oscillator projecting sound waves towards a liquid are counted, a new count starting at the time reflections are received from artificially introduced reflecting elements, as well as from the surface so that the counting means will indicate the number of cycles generated at the last count during reflecting of the wave from the last reflection element, and inaccuracies due to change in propagation speed along the wave guide will be eliminated.

---

The present invention relates to apparatus for measuring of liquid level and more particularly to apparatus to measure the distance of a liquid surface from a reference point by means of sound waves.

Various kinds of apparatus to measure liquid level have been proposed; floats have disadvantages due to the mechanical connection necessary; further, when the liquid level surface changes rapidly, they are incapable of following such rapid changes.

Accoustic apparatus to measure liquid level by reflecting sound waves, as heretofor used, have the disadvantages that, if physical or chemical conditions of the medium through which sound propagates change, then the measurement will no longer be accurate because the time of propagation of sound waves for different materials varies.

It is an object of the present invention to provide a liquid measuring apparatus which avoids the above referred to disadvantages, and which provides rapidly responsive liquid level measurements for a variety of sound propagating media.

Briefly, in accordance with the present invention, a sound wave is directed to a liquid along a sound wave guide path. A plurality of fixed reflection elements are associated with the guide path. Reflections are picked up both from the fixed reflection elements and from the surface of the liquid itself. The reflections from the fixed reflection elements are counted; by means of discriminating between amplitudes of reflective waves, the reflection from the surface of the liquid and from the reflection elements can be readily determined. By reading the counter, distance from a reference point, as counted by the reflection elements passed by, can be measured.

To improve the accuracy, means may be provided to further measure the distance of the liquid surface between reflection elements; or, in the alternative (or additionally thereto) a number of wave guides with reflection elements staggered and offset with respect to each other may be used and the reflection from the liquid surface itself determined with reference to reflections received from the various reflection elements of the various sound wave guides.

The structure, organization and operation of the invention will now be described more specifically in the following detailed description with reference to the accompanying drawings, in which:

FIG. 7 is a schematic diagram for use with the apparatus of FIG. 6; and

FIGS. 8A through 8E are wave shapes occurring when using the apparatus of FIG. 6.

Figure 1:
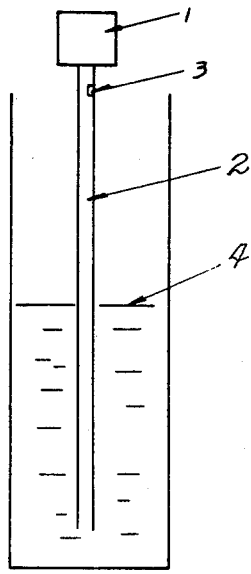
FIG. 1 illustrates an apparatus according to the prior art.

Referring now to the drawings, and in particular to FIG. 1: An electro-acoustic transducer 1 has a sound wave guide 2 attached thereto, which is inserted into the liquid, the level of which is to be measured, contained in a tank. If a pulse or wave is transmitted from transducer 1 through sound wave guide 2, the liquid surface 4 will cause a reflection of the sound wave. The reflected wave is received, and the time elapsed between transmission and reception of the pulse is a measure of the liquid level. A fixed reflector 3, which may be no more than a metal pin inserted into sound wave guide 2, may be used to provide a reference for correction of variations of sound transmission speed within the wave guide 2. Nevertheless, the actual velocity of the sound reflected from surface 4 cannot always be accurately determined due to changes in physical or chemical characteristics within the medium of sound transmission in tube 2.

According to the present invention, the apparatus for measuring a liquid level utilizes a plurality of reflector elements inserted at given distances in the sound transmission tube. These reflection elements will each reflect a portion of the transmitted sound wave. Their number can be counted. Further, an oscillator can be arranged to provide a given number of cycles, or pulses, between the reflection time from a pair of reflectors; by then counting the number of pulses, or cycles, a further measure of the liquid level between reflectors can be obtained.

Figure 2:
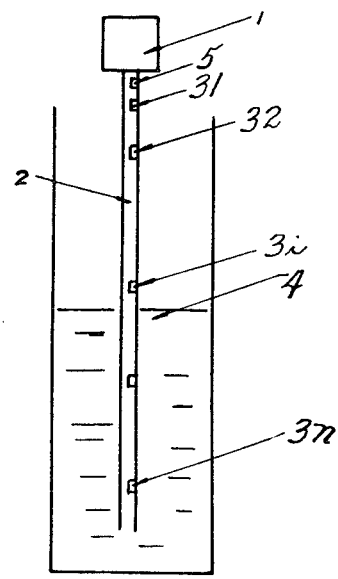
FIG. 2 illustrates, in contrast, in schematic form, apparatus according to the present invention.

In FIG. 2, the electro-acoustic transducer 1 is again connected to sound wave guide 2. Reflection elements $3_1$, $3_2, \ldots 3_i \ldots 3_n$ are inserted in the wave guide. A good measuring distance may be 1 meter between reflection elements. At the top of the sound wave guide, an opening 5 may be provided to form an air hole so that the liquid within tube 2 will have the same level as the liquid in the tank to be measured and will be at the surface level 4.

Figure 3A:
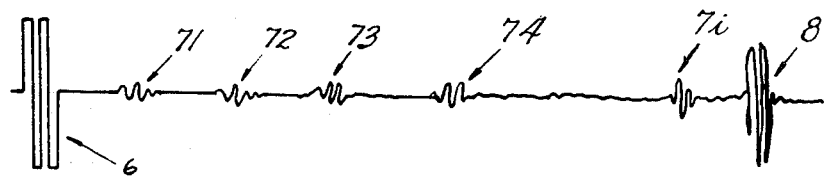
FIGS. 3A, 3B, 3C shows wave shapes analyzed by the apparatus.

Electro-acoustic transducer 1 has an electrical signal applied thereto as shown by the first initial pulse 6 of FIG. 3A. The electric energy is converted, in transducer 1, into sound energy. The sound energy progresses in sound wave guide 2 towards the liquid surface. As the sound wave progresses downwardly in FIG. 2 towards the liquid surface, it is partially reflected by a reflection elements $3_1$, $3_2$ . . . . Upon reaching the liquid surface 4 within sound tube or guide 2, the sound is again reflected backwardly. The reflected sound wave progresses through the sound wave guide 2 towards the electro-acoustic transducer 1, whereupon the sound energy is again converted into electrical energy.

Signals measured at transducer 1 are shown in FIG. 3A, where waves $7_1$, $7_2$ etc. illustrate the reflections from the various corresponding reflecting elements 3; wave 8 shows the reflected wave from the liquid surface. The size of the reflecting elements 3 are selected in such a manner that the amplitude of reflection of wave 8 is substantially greater than the amplitude of the reflection detected from the reflecting elements, as shown in FIG. 3A. Thus, by amplitude discrimination, a sufficient ratio of reflection element signal to noise and liquid surface signal to reflection element signal can be obtained. Preferably, the amplitude of the reflected wave 7 should differ from the reflected waves 8 by being in the range of about ⅕ to ¹⁄₂₀ of the amplitude of wave 8, that is from 4–14 to −26 db.

Figure 3B:
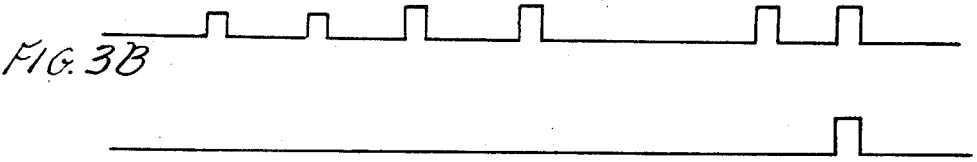
Figure 3C:

The farther the received wave has to travel, the more it is damped. In order to provide for good signal to noise level, and for good amplitude discrimination, the received waves are converted into pulses as shown in FIG. 3B. As seen in FIG. 3B, the amplitudes of all the received pulses are equalized. In addition, an amplitude discrimination is effected and when the difference between received pulses 7 and pulses 8 is 20 db or less, as referred to above, the pulses received from reflection elements 3 can be entirely suppressed and only the pulse from the liquid surface detected, as shown in FIG. 3C. Counting the number of pulses detected before the detection of the pulse from the liquid level will be a measure of the distance of the liquid surface from the transducer within the range of spacing between reflecting elements 3.

As referred to, a convenient distance between reflecting elements 3, which also affords good signal to noise ratio, may be 100 cm. The measurement of the liquid level will thus be in the meter range. To determine, subsequently the centimeters distance, the frequency of the oscillator 1 can be adjusted in such a manner that, for example, 100 cycles are transmitted in the time interval between adjacent reflection pulses received from reflecting elements 3, for example between pulses $7_2$ and $7_3$. By then counting the number of cycles between reflection elements, and resetting the count each time the new element is passed, liquid level distance between element $3_1$ and the level 4 can be determined, with accuracy of 1 cm.

A small error may be introduced by differences in the propagation speed between various sections within tube 2; this error is very small, however, and for all practical purposes may be ignored. Mathematically: the equation for error is as follows:

$$\text{Error} = X\left(1 - \frac{U_x}{U_s}\right)$$

wherein $x$ is the distance from the fixed reflection point directly before liquid surface to the liquid surface; $U_x$ the mean velocity of sound within the section $x$ and $U_s$ the velocity of sound within a standard section. Accordingly, when the mean velocity of sound in the standard section and in the section up to the liquid are equal, the error is zero. This would be the case if the velocity of sound does not change in the section of at least two units above the liquid surface. The change in sound velocity occurring in adjacent sections is very small, if the sections are continuous.

Figure 4:
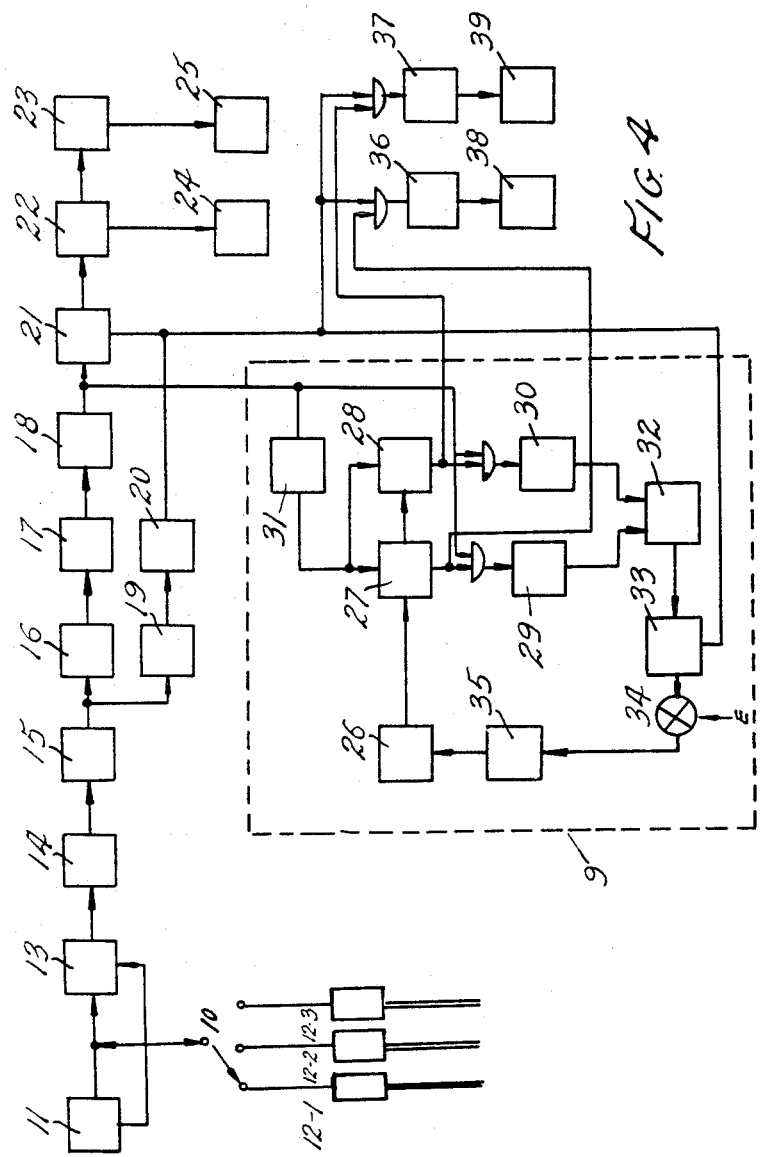
FIG. 4 is an electrical, schematic block diagram illustrating the apparatus.

Electrical circuitry in accordance with the present invention is illustrated in FIG. 4. A transmitting oscillator 11 provides signals 6 (FIG. 3A) which are applied to transducers 12–1, 12–2, 12–3, each corresponding to a transducer 1, of FIG. 2. The use of a plurality of transducers will be further explained below. Assume that the oscillator 11 is connected to one transducer 12–1 by switch 10, as illustrated.

The pulse 6 is transmitted not only to the transducer, but also to a gate 13 which acts as a T–R switch, or blanking gate to disable the receiver when the oscillator sends its sending pulse. Gates of this kind are well known in the art. Gate 13 may be disabled by a control pulse separately transmitted thereto as schematically indicated. Received pulses are transmitted from gate 13 to a circuit 14 which corrects the damping of waves and has an exponential gain, as time elapses, in order to compensate for progressive damping of the received pulses as they have to travel up tube 2. The compensated pulses are applied to an amplifier 15; and then are applied to a pair of parallel circuits. Circuit 19 is a further amplifier and is the detector for the liquid surface wave. Its amplification is so adjusted that it has low gain and will not detect pulses 7 (FIG. 3) but has an output only as appears in FIG. 3C). 20 is a wave shaper connected to circuit 19 to provide a square pulse. Parallel to the liquid level detector is a reflection detector circuit 16 which has an amplification factor much larger, for example ten times the amplification of amplifier 19. 17 is a detector-limiter, and 18 is again a wave shaping circuit to provide an output of equal amplitude pulses as shown in FIG. 3B.

The output obtained from circuit 18 (FIG. 3B) is applied to a gate 21 which is also controlled by the output from the liquid level detection circuit 19, 20. The output from gate 21 is applied to decimal counters 22, 23 (two stages being shown) which are connected to indicators or meters 24, 25 for two decimal positions, respectively. Counter 22, 23 starts to count pulses as soon as the transmitted pulse from generator 11 has been sent; as soon as the reflected pulse from the liquid has been sensed by circuit 18, 19 counting of counter 22, 23 stops. Thus, the count represents the distance from transducer 1 to the liquid level, in meter units, provided that, for example, fixed reflection elements 3 are placed once every meter.

The circuit within dotted line 9 is designed to measure the liquid level down to centimeter units. Auxiliary oscillator 26, having a controlled output frequency, provides pulses or waves to counter 27, 28 (two stages shown for a decimal system), which count the number of output pulses or cycles of the oscillator 26. Counter 27, 28 transfers the count content therein to registers 29, 30, under control of the pulse obtained from pulse shaping circuit 18. Each time a pulse from pulse shaping circuit 18 is obtained, the counter 27, 28 is reset by having a pulse from pulse shaper 18 applied, through a delay element 31 to the counter as shown. Thus, counter 27, 28 starts to count pulses of auxiliary oscillator 26 and transfer the content of the count to registers 29, 30 and the registers are reset each time a new reflection from a fixed reflecting element 3 is obtained. The output of registers 29, 30 is applied to a digital-analog converter 32, which converts the contents of the digital signals within registers 29, 30 into an analog signal, for example D-C voltage. The voltage obtained from D/A converter 32 is applied to a sampling and holding circuit 33 which samples the voltage of the D/A converter each time a pulse is received from the liquid level, that is from circuit 20. The voltage level of this pulse is compared in a comparator 34 with a standard value indicated as E, corresponding to normalized 100 cycles between reflection elements 3 of sound tube 2. The error signal is amplified in amplifier 35 and fed back to auxiliary oscillator 26 in order to control the frequency of oscillator 26.

It is seen that a closed servo loop is provided as follows: 26–27, 28–29, 30–32–33–34–35 back to 26. The servo loop is so connected that voltage difference at the control circuit 34 goes to zero. In this case, the content of registers 29, 30, will each correspond to the number of pulses actually counted at the time the last fixed reflection was received. The D/A converter 32, and the holding circuit 33 will compare an analog representation of the number with the proper, or preset value, corresponding to 100 cycles, and an error or correction signal will be applied to auxiliary oscillator 26 to hold the frequency of oscillator 26 at such a value that 100 cycles will be generated in the time of reflection between adjacent elements 3. The contents of counters 27, 28 are additionally transferred into a register 36, 37, having meters or indicators 38, 39 associated therewith. Registers 36, 37 are additionally controlled by AND gates, as shown. The content transferred into registers 36, 37 and indicated at 38, 39 will correspond to the number of waves or cycles contained within counters 27, 28 from the time of the last fixed reflection and thus will be an indication in centimeter values of the distance of the liquid level from the last fixed reflecting element 3.

Thus, a pulse having a frequency of 100 cycles in a standard section is counted from the fixed reflection directly before the liquid surface, up to the liquid surface. Of course, other values than distances of one meter may be selected; it has been found however that for usual liquids this is a convenient distance between elements.

Figure 5:
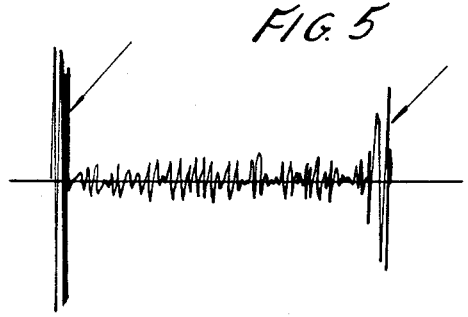
FIG. 5 is a drawing of a wave shape as received.

It is preferable to shorten the distance between fixed reflection elements 3 in order to determine the distance to the liquid most accurately. The lower limit of distance between these elements depends on the damping effect of the electro-acoustic transducer, and the signal to noise ratio, and the ability of the electrical circuits to discriminate between noise and adjacent reflected signals. For example, if the reflection elements are placed too close, the received wave form will not be as in FIG. 3A, but rather as in FIG. 5. Such a wave cannot be analyzed for separate and distinct pulses. In order to decrease the distance, effectively, between adjacent reflection elements, the invention in accordance with the embodiment shown in FIG. 6 may be used.

Figure 6:
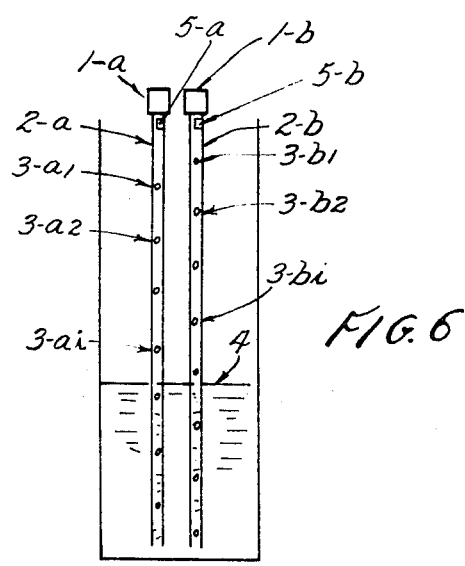
FIG. 6 illustrates an apparatus in accordance with a modification.

As shown in FIG. 6, a plurality of sound wave guides, arranged in parallel, are used. The reflecting element 3–$a1$, $a2$ . . . etc. and 3–$b1$, $b2$ . . . etc. are arranged in separate sound wave guides 2–$a$, 2–$b$ respectively. Each one is energized by a separate transducer 1–$a$, 1–$b$, and each one has its separate equalization hole 5–$a$, 5–$b$. Correspondingly numbered reflecting elements 3 are offset with respect to each other, for example half-way as shown in FIG. 6. When three such parallel sound wave guides are used, as illustrated in connection with FIG. 4 ($c$ 12–1, 12–2, 12–3) the offset may be one-third of the distance between adjacent elements 3. Again, the distance between the elements of any one sound wave guide may be one meter.

FIGS. 7 and 8 illustrate a schematic circuit, and waves occurring within the circuit when utilizing plural sound waves guides, for example using a pair. A sending signal generator 40 feeds a transmitted signal to amplifiers 41$a$, 41$b$, the output of which is being applied to transducers 1–$a$, 1–$b$. Reflected signals, received from transducers 1–$a$, 1–$b$ are applied to a pair of amplifiers 42$a$, 42$b$, amplified, limited, detected and wave-shaped similar to the wave shaping and amplification in circuits 13 through 18. The output of circuits 42$a$, 42$b$ are applied to a summer or adding circuit 43.

The waves in a circuit are shown in FIG. 8. FIG. 8A illustrates the terminal voltage of the electro-acoustic transducer 1$a$; FIG. 8B is the output voltage of receiver 42$a$; FIG. 8C is the terminal voltage of the electro-acoustic transducer 1–$b$; FIG. 8D is the output voltage received from the receiver 42$b$; and the diagram of FIG. 8E is the output voltage of the summer or pulse synthesizer 43.

The transmitted wave 6 is identical in each instance; reflected waves 7 are shown, as well as the reflection received from the liquid surface 8. By comparing the diagrams $a$ and $c$ of FIG. 8 with FIG. 6 it can be seen that a resolution of less than the entire distance between adjacent reflection elements can be obtained. It can be assumed that the propagation conditions existing within sound wave guides 2$a$ and 2$b$ are similar, so that the output of the adding circuit 43 will accurately reflect the distance of the liquid level 4 from the transducers 1–$a$, 1–$b$. A counter 44, connected to summer circuit 43, will count the number of pulses.

To determine the distance in a unit less than 50 centimeters, in centimeter units, an auxiliary oscillator 45 similar to oscillator 26, FIG. 4 is used. The number of pulses, or cycles of oscillator 45 is counted by a counter 46, connected to the oscillator through a gate 50 and gated ON and OFF from either one or the other of amplifier units 42. The content of counter 46 is transferred into a register 47, upon coincidence with each reflection pulse obtained from summer 43 as shown by the AND gate. The output pulse of adding circuit 43 is further delayed in a delay circuit 48 in order to reset the content of the counter 46 to zero a predetermined time after each pulse from summer 43. Thus, counter 46 counts the number of cycles or waves of auxiliary oscillator 45 directly after the pulse formed from fixed reflectors, located every 50 cm. distance to the next reflection element, and transfers its content to register 47.

As register 47 cycles, it will first contain the number of cycles or waves derived from auxiliary oscillator in the first section, that is the time taken to reflect a wave between the first fixed reflector element 3 and the second similar fixed reflector element; then it will contain the number of cycles in the second section and so on until finally it will contain the number of cycles in the section directly before the liquid surface. The content of register 47 is converted into a voltage by $D/A$ converter 49. In accordance with the present embodiment, only the number of waves in the section directly before the liquid surface is converted to an analog voltage. Sampling of this voltage is done in a circuit 52 by means of a pulse output obtained from either of amplifiers 42 at the point where the amplification is low, that is where the input level to the amplifiers is still high. Thus, pulse applied to circuit 52 comes from one of the upper sections, or a section adjacent to transducer 1. A value representative of the number of pulses close to the transducer is held in circuit 52, to form a comparison value with respect to the analog value corresponding to a number of pulses close to the liquid surface.

An error voltage is again obtained from unit 52 and applied back to the oscillator 45 to correct or change the oscillator frequency of oscillator 45 as obtained from a comparison of voltage, or current values which are analogs of cycles or numbers of pulses between respective sections close to and remote from transducer 1.

Gate circuit 50, placed before counter 46 is opened at the time and transmitted wave or pulse is transmitted towards the liquid surface, and again reopened each time a reflected pulse from reflecting element 3 is received. The counter 46 will hold the number of cycles, or waves of oscillator 45 from such transmitted, or last reflected pulse. A self-resetting register 51 is provided, opened each time a pulse is applied to gate 50, and recording the number of cycles or pulses from oscillator 45, so that the contents of register 51 will directly show the distance from the last fixed reflector until the next pulse; if the next pulse is not from a fixed unit, causing reset of the register 51 and renewed counting, then it must be from the last pulse, that is from a closer pulse reflected by the liquid itself as shown in pulse 8, FIGS. 8A and 8C.

The present invention thus provides apparatus to measure liquid levels; a distance shorter than the overlap, or noise distance (referring for example to FIG. 5) can be resolved by plural transducer elements and sound wave guides, associated with suitable circuitry and gates. A pair of sound wave guides are shown in FIG. 7 and described in connection with FIG. 8; any other numbers may of course be used in parallel. By increasing the number of parallel elements, the distance from the transducers can be measured very accurately.

The electrical components for the apparatus have been shown in block diagram form. The individual elements of the components, amplifiers, gates, discriminators and the like are well known in the art; reference may be made, for example, to "Transistor Manual," Fourth edition, General Electric Company, 1964, and in particular to the index listing appropriate components and sub-elements from which the circuits shown in block diagram can be constructed by those skilled in the art. Of course, other general textbooks in the electronics field describe suitable circuits for use in connection with the present invention.

I claim:
1. Apparatus for measuring the level of a liquid surface comprising
a sound wave guide;
an electro-acoustical transducer transmitting acoustical energy toward said liquid through said sound wave guide;
a plurality of reflector elements arranged in said sound wave guide and uniformly spaced from each other at equal intervals;
means receiving reflections from said elements and from said surface;
means analyzing the reflected waves and discriminating between reflections received from said reflection elements and said liquid surface, and providing an output pulse upon detection of a wave reflected from a reflector element and an output signal upon detection of a wave reflected from said surface;
an oscillator;
counting means connected to said oscillator to count the number of cycles of oscillations of said oscillator, said counting means being connected with said receiving means and responsive to said output pulses to start a new cycle of counts each time a pulse is received from said discriminating means;
and means recording the count of said counting means, said recording means being controlled by the output pulse and the output signal to hold the count of said counting means so that said recording means will indicate the number of cycles generated between successive pulses reflected from said reflection elements, and, as the last record, will contain the number of cycles generated during reflection of the wave from the last reflection element and the surface of said liquid.

2. Apparatus according to claim 1 including means connected to said oscillator to derive therefrom a first signal representative of the number of cycles of oscillations between successive output pulses from said discriminating means;
means supplying a reference signal representative of a predetermined number of cycles of oscillations during the reflection from adjacent elements in said sound wave guide;
means comparing said first and said reference signal and deriving an error signal representative of the difference obtained from said comparison;
and means applying the error signal to said oscillator.

3. Apparatus according to claim 2 wherein said predetermined number is a multiple of ten so that the oscillator will be controlled to supply a multiple number of ten cycles between adjacent elements and the number of cycles between the last element and the surface of the liquid will be a decimal fraction of the distance between elements.

4. Apparatus according to claim 1 wherein a plurality of acoustical transducers and a plurality of sound wave guides are provided, each sound wave guide having a plurality of reflector elements arranged therein, the reflector elements in one sound wave guide being off-set with respect to those in another sound wave guide;
and switch means are provided selectively connecting a selected sound wave guide to said reflection receiving means.

5. Apparatus according to claim 1 wherein a plurality of acoustical transducers and a plurality of sound wave guides are provided, each sound wave guide having a plurality of reflector elements arranged therein, the reflector elements in one sound wave guide being off-set with respect to those in another sound wave guide;
and including a plurality of receiving means to receive reflections from said elements and said surface in each sound wave guide;
means deriving output pulses and output signals from said reflections;
adding means having said output pulses from said plurality of receiving means applied thereto;
and means counting said pulses applied to said adding means.

References Cited
UNITED STATES PATENTS
| | | | |
|---|---|---|---|
| 2,713,263 | 7/1955 | Turner | 73—290 |
| 2,787,160 | 4/1957 | Van Valkenburg | 73—290 |
| 3,113,456 | 12/1963 | Smith et al. | 73—290 |

S. CLEMENT SWISHER, *Acting Primary Examiner.*

D. O. WOODIEL, *Assistant Examiner.*